United States Patent [19]
Dodd, Jr. et al.

[11] Patent Number: 5,930,742
[45] Date of Patent: Jul. 27, 1999

[54] WHEELED FLEET INFORMATION PROCESSING AND REPORTING SYSTEM INCLUDING HUBMETER

[75] Inventors: William A. Dodd, Jr., Clearwater; Laurin K. Dodd, Dunedin; Gregg Juett, Clearwater, all of Fla.

[73] Assignee: Golf Car Systems, Inc., Clearwater, Fla.

[21] Appl. No.: 08/769,762

[22] Filed: Dec. 19, 1996

[51] Int. Cl.[6] ........................................ G06F 7/00
[52] U.S. Cl. ............................ 702/158; 701/93; 701/96; 340/825.06
[58] Field of Search .............................. 364/561, 424.01, 364/426.07; 340/825.06, 459, 438; 323/281; 361/87

[56] References Cited

U.S. PATENT DOCUMENTS

| | | | |
|---|---|---|---|
| 3,779,086 | 12/1973 | Myrent et al. | 73/490 |
| 4,000,465 | 12/1976 | Sugiyama | 324/166 |
| 4,692,882 | 9/1987 | Skovgaard et al. | 364/565 |
| 4,803,646 | 2/1989 | Burke et al. | 364/561 |
| 4,843,578 | 6/1989 | Wade | 364/565 |
| 4,894,641 | 1/1990 | Yang | 340/466 |
| 4,916,953 | 4/1990 | Lie | 73/535 |
| 5,329,449 | 7/1994 | Tanizawa et al. | 364/424.02 |

*Primary Examiner*—John Barlow
*Assistant Examiner*—Kamini Shah
*Attorney, Agent, or Firm*—Larson & Larson, P.A.; James E. Larson

[57] ABSTRACT

A wheeled fleet information processing and reporting system includes a hubmeter to be mounted on an axle of a vehicle that is being monitored. With each rotation of the wheel associated with the axle, an electronic pulse is generated and transmitted to a microcomputer. The microcomputer stores time data as well as rotation data. Periodically, at regular time intervals, the microcomputer reads the time from a built-in electronic clock and reads the accumulated rotation count total and stores the time and corresponding count total in memory. Periodically, an external reading device is placed in close proximity to the hubmeter and instructs the microcomputer to retrieve the contents of the memory, format the contents, and serially transmit them to the external reading device so that the data from the hubmeter may be processed and reprinted by the system to the user of the system for monitoring, controlling and maintaining a fleet of vehicles.

19 Claims, 8 Drawing Sheets

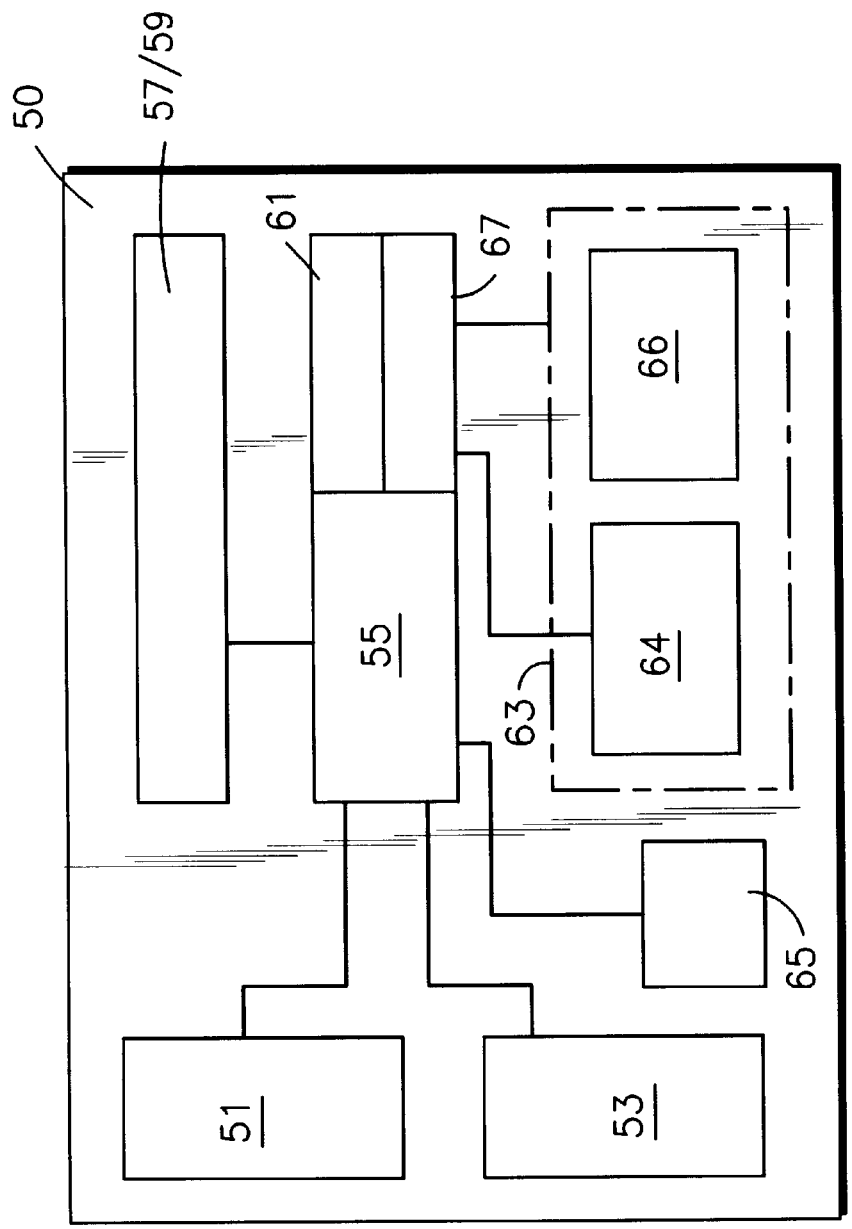
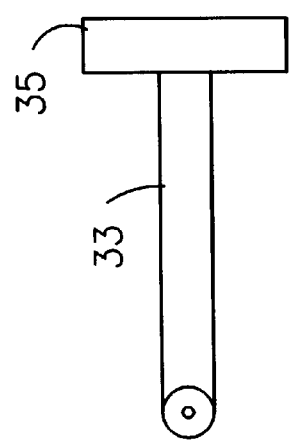
Fig. 3

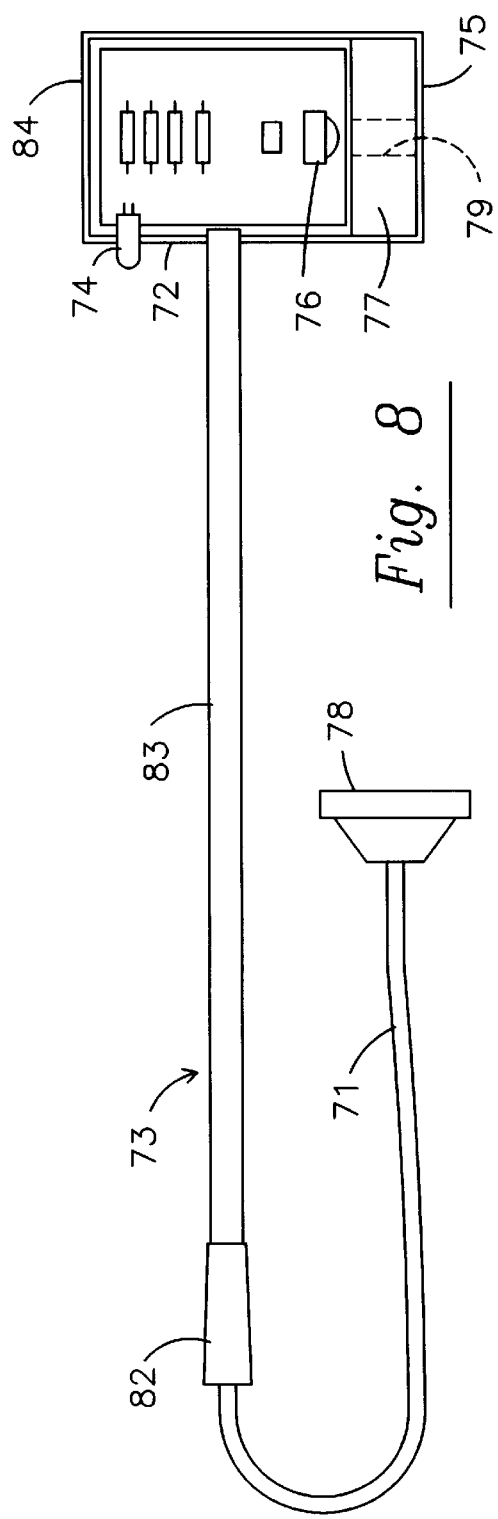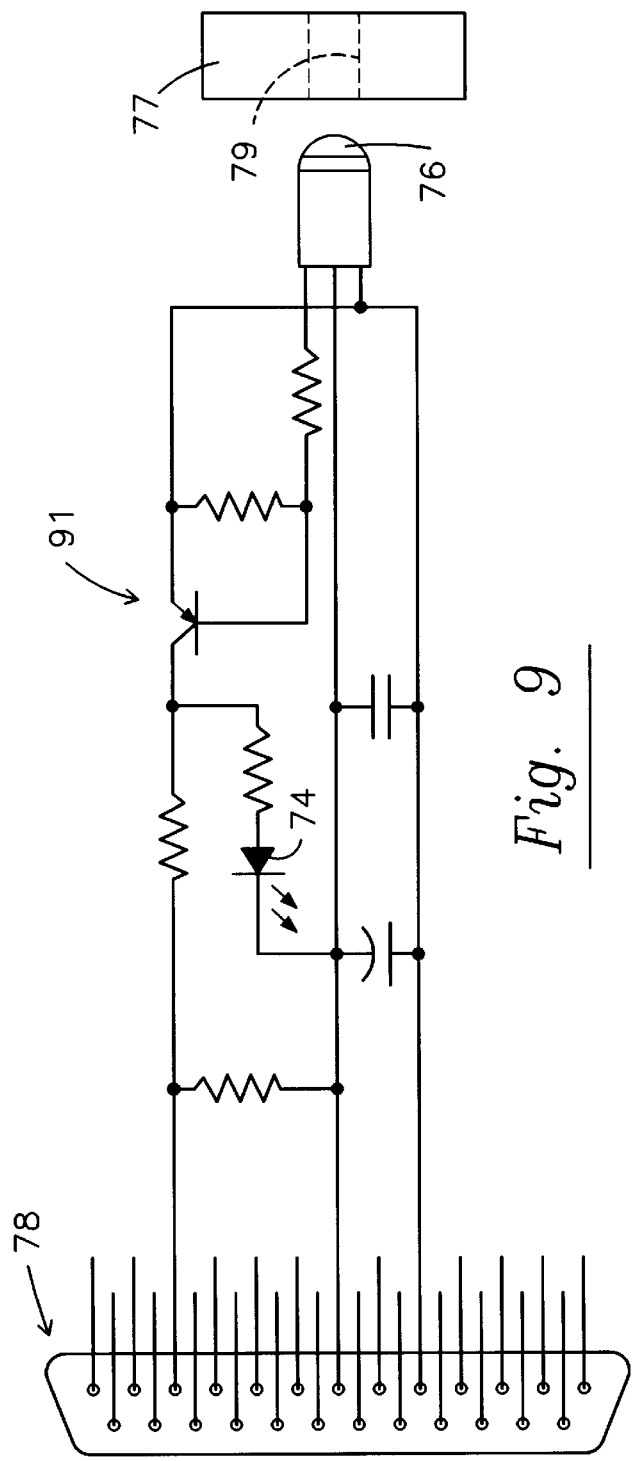

WHEELED FLEET INFORMATION PROCESSING AND REPORTING SYSTEM INCLUDING HUBMETER

BACKGROUND OF THE INVENTION

The present invention relates to a wheeled fleet processing and reporting system including an improved hubmeter. In the prior art, metering devices are known that measure and store and display such data as distance traveled by wheeled vehicles (e.g., mechanical odometer) or energy consumed (e.g., a watt-hour meter) as an index of distance traveled, or time elapsed (e.g., hour meters) as an index of distance traveled. However, systems that collect such metered-data for fleets of vehicles, and process such data, and output such data into meaningful fleet-information monitoring reports for the user of the system are not known. In addition, devices that not only measure and keep track of the number of rotations of a wheel rotating on an axle, but also keep track of the time data concerning when the actual rotations took place are not known. It is with this aspect in mind that the present invention was developed.

SUMMARY OF THE INVENTION

The present invention relates to a wheeled fleet processing and reporting system including improved hubmeter. The present invention includes the following interrelated objects, processes, aspects and features:

(1) A master data base system processing raw meter data, either received from a hubmeter, or collected and input to the system by other metering devices. These data are processed by the system and printed into reports for the user of the system so that the user may keep the vehicles in balanced usage, know when to perform maintenance functions based on the meter data for the vehicles, and provide complete and accurate monitoring of the vehicles' usage.

(2) There is an improved digital hubmeter comprising a self-contained device including a magnet mounted on a pendulum, sensors to sense proximity of the magnet, and built-in PC board carrying a microcomputer. The inventive hubmeter is mounted on a vehicle so that the PC board thereof rotates in concert with rotations of the associated vehicle wheel. In this way, each rotation of the PC Board causes activation of a magnetically sensitive sensor. When the sensor is activated, it sends a pulse to the microcomputer that registers and stores the pulse.

(3) The hubmeter has a built-in electronic clock that keeps track of the time of day in a precise fashion. Periodically, at regular time intervals, the microcomputer reads the time from the built-in electronic clock and also simultaneously reads the accumulated rotation count total and stores this data in the memory for later retrieval.

(4) The inventive system, when used with the hubmeter, also contemplates the use of an external reading device, the "wand", that is so designed that when placed in proximity to the hubmeter, the microcomputer is caused to retrieve the memory contents, format the memory contents, and serially transmit them into the external reading device, which reading device then relays the data to a hand-held computer which computer in-turn transmits the data via a modem to a host computer on which the inventive master data base system processes the data.

Accordingly, it is a first object of the present invention to provide a wheeled fleet information processing and reporting system.

It is a further object of the present invention to provide a wheeled fleet processing and reporting system with an improved hubmeter which hubmeter electronically collects and transmits meter data to the system.

It is a further object of the present invention to provide such a system wherein the hubmeter has a built-in microcomputer.

It is a yet further object of the present invention to provide such a system wherein the hubmeter microcomputer monitors the number of rotations of an associated vehicle wheel but also keeps track of, via a built-in timer, the cumulative rotation total with respect to time.

It is a still further object of the present invention to provide such a system wherein reports may be generated from raw data provided to the system, either from the hubmeter, or transmitted meter data from other devices, so that the user may monitor operation of a fleet of wheeled vehicles.

These and other objects, processes, aspects and features of the present invention will be better understood from the following detailed description of the preferred embodiment when read in conjunction with the appended drawing figures.

BRIEF DESCRIPTION OF THE DRAWINGS

FIG. 3 shows a schematic representation of the electrical circuitry of the hubmeter.

FIG. 8 is a top plan view partially in section of a wand used to obtain data from the hubmeter.

FIG. 9 is a schematic of the circuit used in the wand of FIG. 8.

SPECIFIC DESCRIPTION OF THE PREFERRED EMBODIMENT

Figure 1:
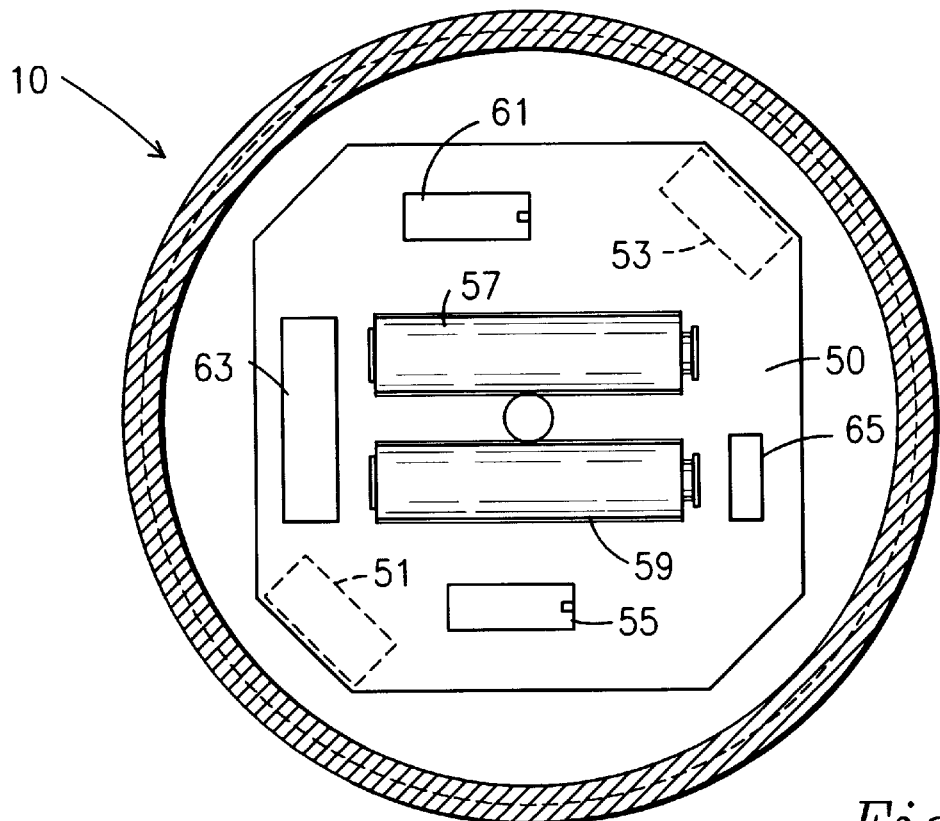
FIG. 1 shows a top view of a digital hubmeter in accordance with the teachings of the present invention.
Figure 2:
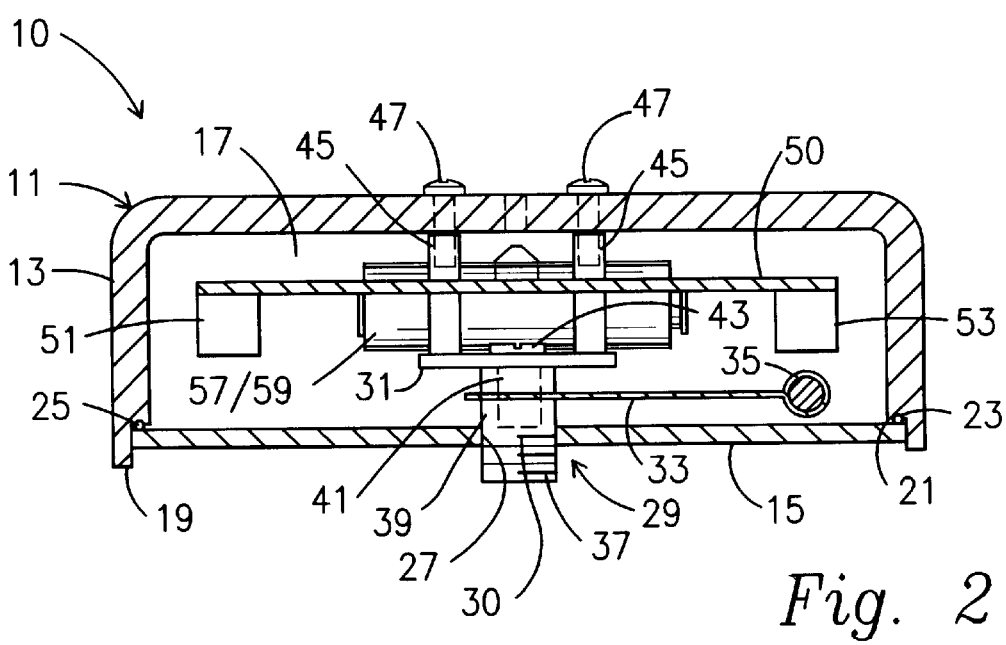
FIG. 2 shows a side view of the hubmeter with parts broken away and partially in cross-section to show detail.

Reference is first made to FIGS. 1 and 2, top and side views of the digital hubmeter, respectively, in accordance with the teachings of the present invention. The hubmeter is generally designated by the reference numeral 10 and includes a housing 11 including a case 13 and a back plate 15 which, together, define an internal chamber 17. The back plate 15 is attached to the case 13 in any suitable manner. Preferably, the case 13 has a peripheral end wall 19 defining a radially inwardly directed shoulder 21 including a groove 23 that receives an O-ring 25. The back plate 15 is received on the shoulder 21 and sealingly engages the O-ring 25.

The back plate 15 has an opening 27 therethrough that allows a rotary end. 30 of bearing 29 to protrude therethrough. The support 31 is fixed to the case 13 by posts 45 and screws 47 for a purpose to be explained in greater detail hereinafter. The end 30 of the bearing 29 has a suitable surface configuration such as, for example, the threaded outer surface 37 allowing the bearing end 30 to be coupled to a rotary wheel of a vehicle, the rotations of which are intended to be measured. The bearing 29 rotatably supports a pendulum 33 that carries a magnet 35 at an end distal from the bearing 29. As seen in FIG. 2, the bearing 29 consists of a rotary sleeve 39 slidably received over a fixed post 41. The pendulum 33 is fixed to the sleeve 39 and is constrained to rotate between the support 31 and the backplate 15 around the fixed post 41. The post 41 is directly coupled to the support 31 through the use of a screw fastener 43 that has attached thereto the posts 45 that have internally threaded recesses (not shown) allowing threadable receipt of fasteners 47 to fixedly mount the post 41 of the bearing 29 to the case 13.

As seen with further reference to FIGS. 1 and 2, a PC board 50 is fixedly mounted to the structure including the support 31 and the posts 45. At diametrically opposed ends of the PC board 50, magnetic sensors 51, 53 are mounted. As should be understood, as the printed circuit board 50 rotates in concert with a wheel of a vehicle to which the inventive device 10 is affixed, each half revolution, the magnet 35 attached to the pendulum 33 passes adjacent one of the magnetic sensors 51 or 53 in the close proximity best seen with reference to FIG. 2. Each sensor 51, 53 is mounted into a circuit including a microcomputer 55 (FIG. 1) and batteries 57, 59. As seen in FIG. 3, the PC board 50 also has mounted thereto a memory chip 61 and a receiver device 63 including an input device 64 and output device 66 allowing receipt of read requests and outputting of data as will be described in greater detail hereinafter. As such, as the printed circuit board 50 rotates in concert with the associated wheel (not shown), each time the magnet 35 passes one of the magnetic sensors 51 or 53, a magnetic pulse is generated that each magnetic sensor changes into an electrical current transmitted to the microcomputer 55 in the form of a data pulse. The PC board 50 also has mounted thereon a clock device 65.

In the operation of the inventive hubmeter, as should be surmised from the above description, each time the magnet 35 passes one of the sensors 51 or 53, the respective sensor senses the proximity of the magnet 35 and generates a data pulse that is sent to the microcomputer 55. The microcomputer 55 stores the number of pulses received in the memory 61. Periodically, as pre-programmed, the microcomputer 55 receives information from the clock 65 as to the time of day and the date and adds that information to the information stored in the memory 61 as to the number of received pulses. In this way, the microcomputer 55 keeps track of not only wheel rotation counts but also keeps track of the times of day when the associated vehicle is being used and the duration and degree of use.

A schematic representation of the electrical circuitry involved in the hubmeter 10 is seen in FIG. 3. As seen in FIG. 3, the reference numeral 63 is used to denote the receiver device including the electromagnetic input device 64 and the electromagnetic output device 66. These devices are combined into a single sub-housing on the PC board 50 as seen in FIGS. 1 and 3.

Figure 4:
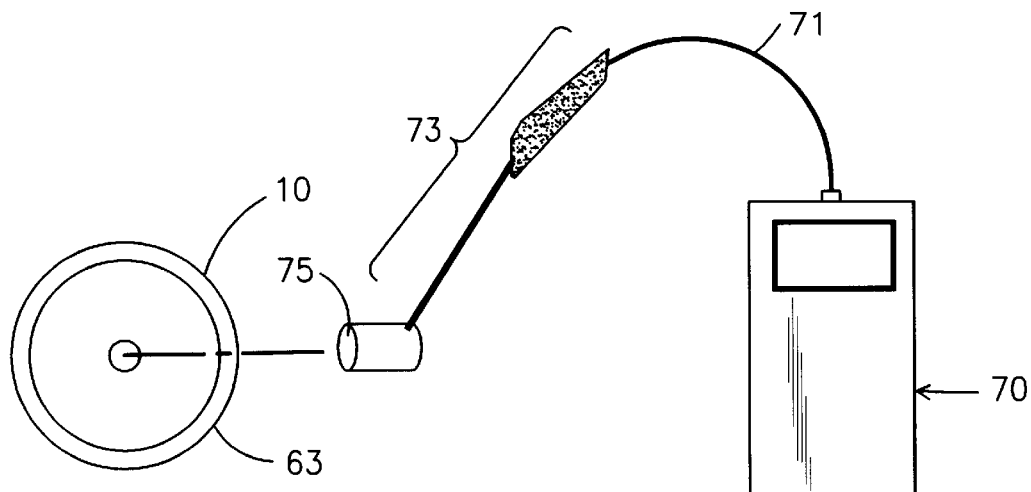
FIGS. 4, 5 and 6 sequentially show operation of the inventive system including the hubmeter of FIGS. 1–3.

Periodically, it is desired to retrieve data from the memory 61 of the inventive device 10. With reference to FIGS. 4, 8 and 9, a handheld computer 70 is provided that has an electrical conductor 71 interconnecting the computer 70 to a reading wand 73. When the tip 75 of the reading wand is placed in close proximity to the receiver device 63 of the hubmeter 10, a signal is appropriately sent to the microcomputer 55 that the computer 70 desires to receive data from the memory 61. Such request is furnished via the input device 64 and input/output device 67 (FIG. 3) to the electromagnetic output device 66 and thence through the reading wand 73, via tip 75 through the conductor 71 to the computer 70.

Figure 5:
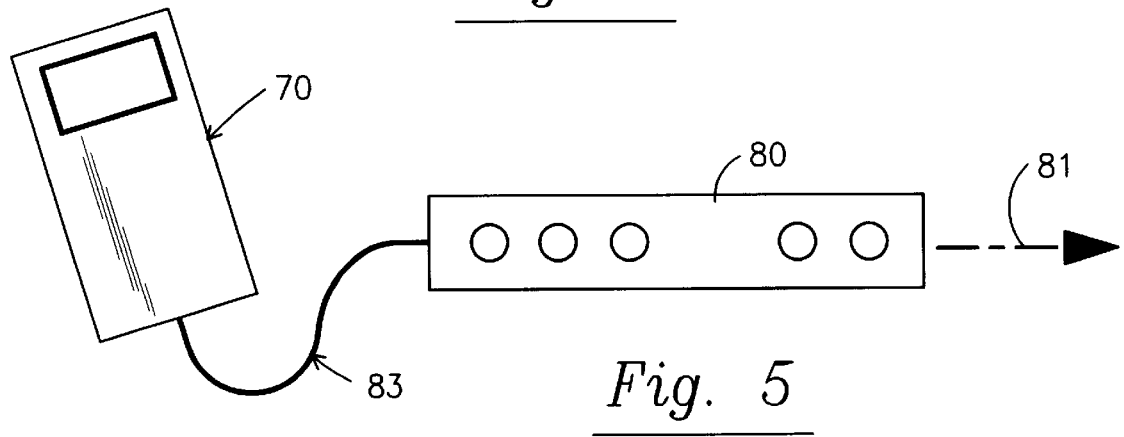

With reference to FIGS. 4 and 5, the reading wand 73 and conductor 71 may be suitably disconnected from the hand held computer 70 once a reading has taken place, and may be electrically connected to a modem 80 via a modem cable 83 and interconnected into a telephone line 81 to allow transmission of data received from the handheld computer 70 via the telephone line 81 to a host computer 90 depicted in FIG. 6 that stores the received data for later processing and formatting into suitable reports. The host computer 90 is programmed to output such reports as "meter change summary report", "balanced fleet usage report", and "vehicle maintenance report". See FIGS. 10–12. Additional reports can be added. If desired, the host computer 90 may be programmed to print a report book to be sent to the user via mail, make facsimile reports directly to the user via a suitable modem or may use the "E-mail" to transmit data directly to the user.

Figure 6:
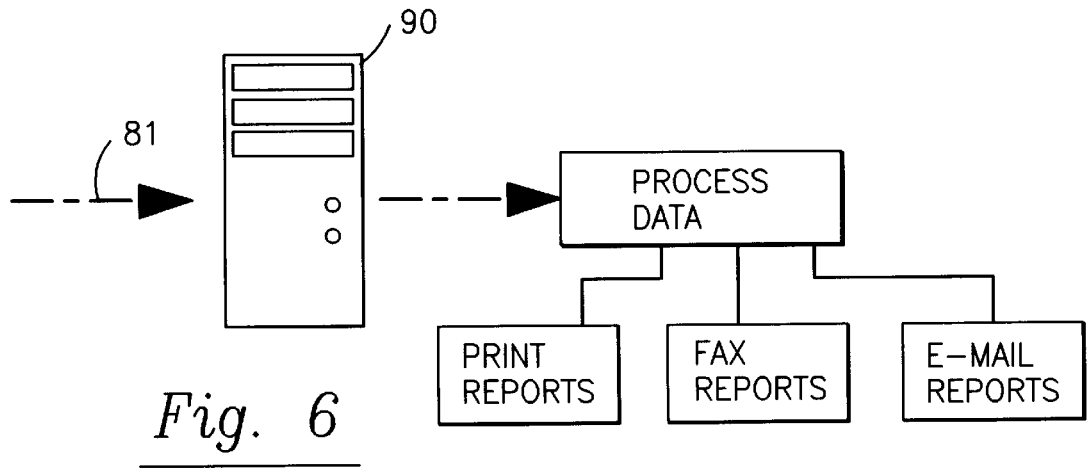
Figure 7:
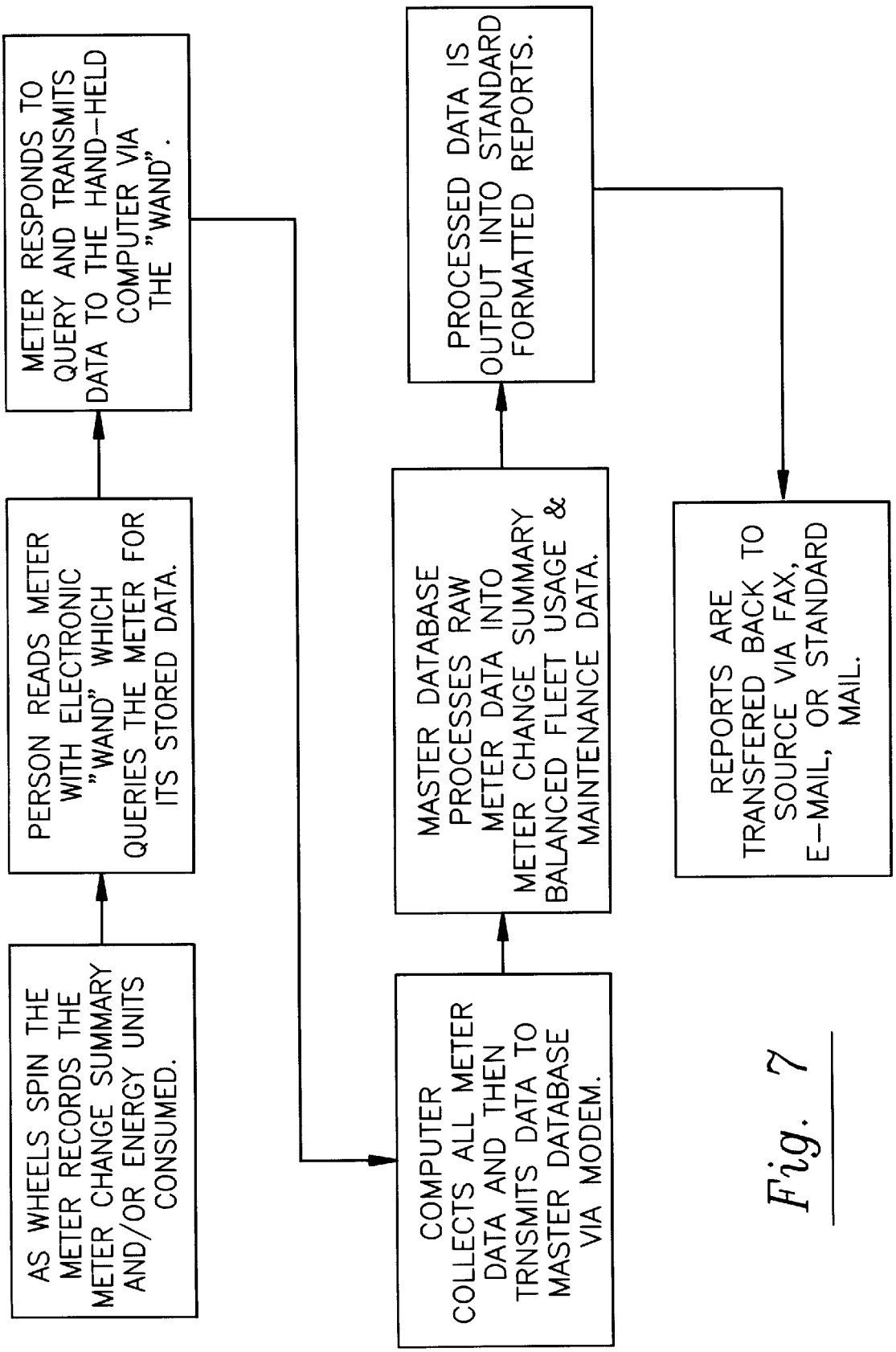
FIG. 7 shows a flow chart of the preferred mode of operation of the inventive system using the hubmeter of FIGS. 1–3.

An overview of the inventive system incorporating the hubmeter 10 and the other components described with reference to FIGS. 4, 5 and 6 is depicted in FIG. 7. Based upon the description set forth hereinabove, the subject matter set forth in FIG. 7 is self-explanatory.

In FIG. 8, the wand 73 is shown in greater detail. The conductor 71 is attached at one end to a hand held computer 70 through connector 78 and at the other end to a handle 82 which is connected in turn to a connector tube 83 attached to a receiver housing 84. The receiver housing 84 contains a PC board 72, an LED 74 and a receiver 76. A magnet 77 is located at the tip 75 of the receiver housing 84 with a receiver port 79 providing access to the receiver 76. The schematic 91 for the PC board 72 is shown in FIG. 9.

Figure 10:
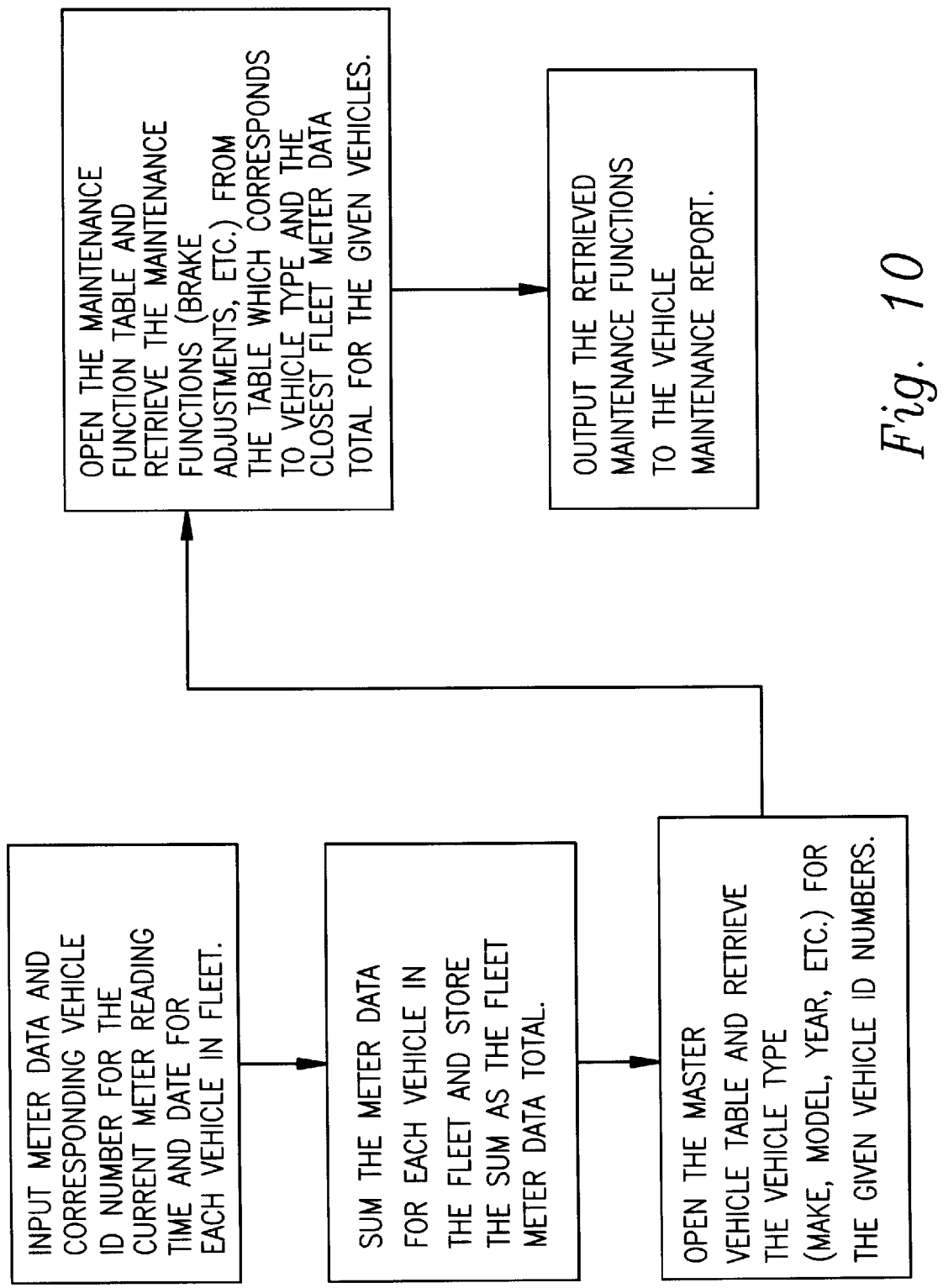
FIG. 10 shows a flow chart of the vehicle maintenance report process program.
Figure 11:
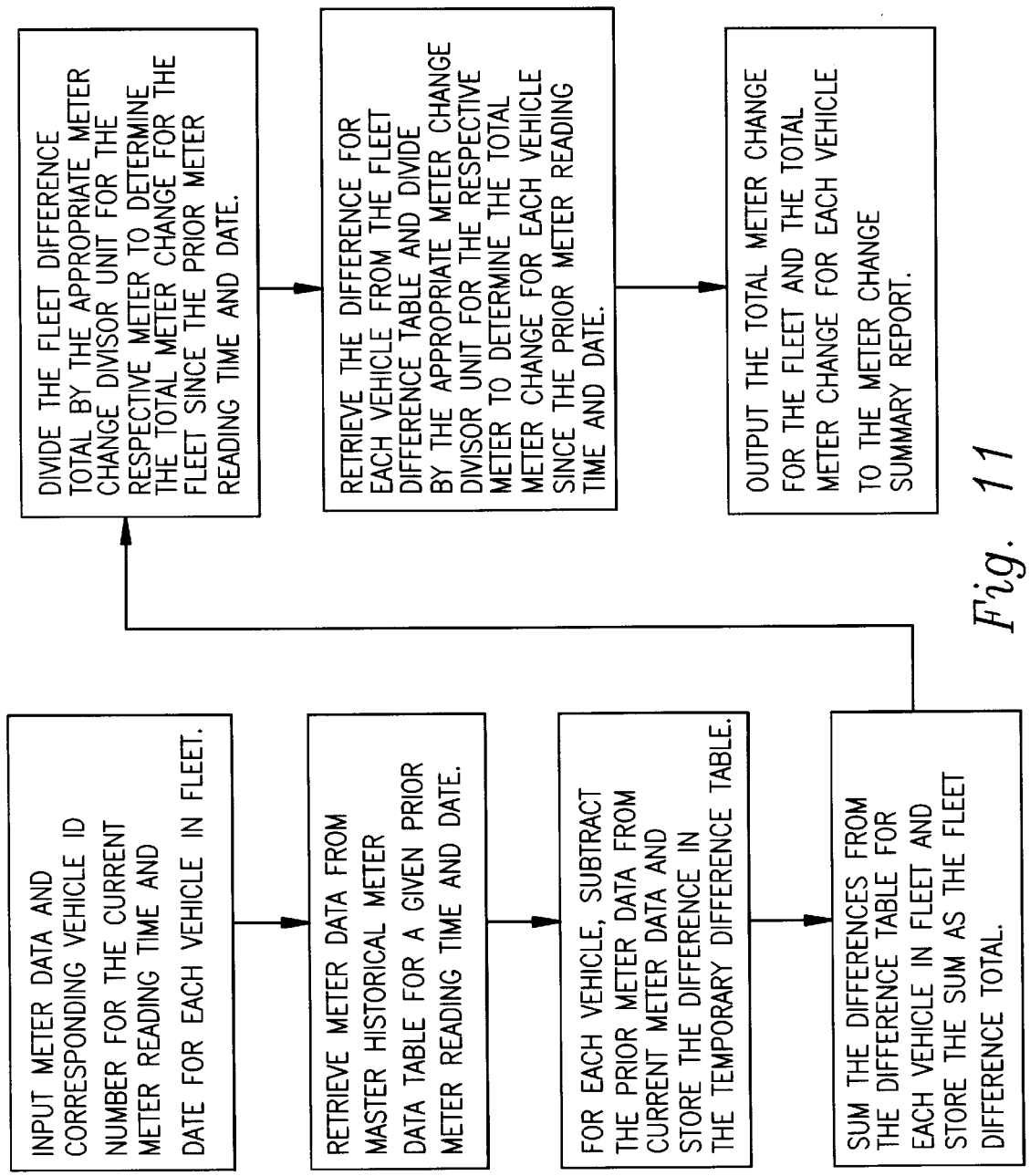
FIG. 11 shows a flow chart of the meter change summary report process program.
Figure 12:
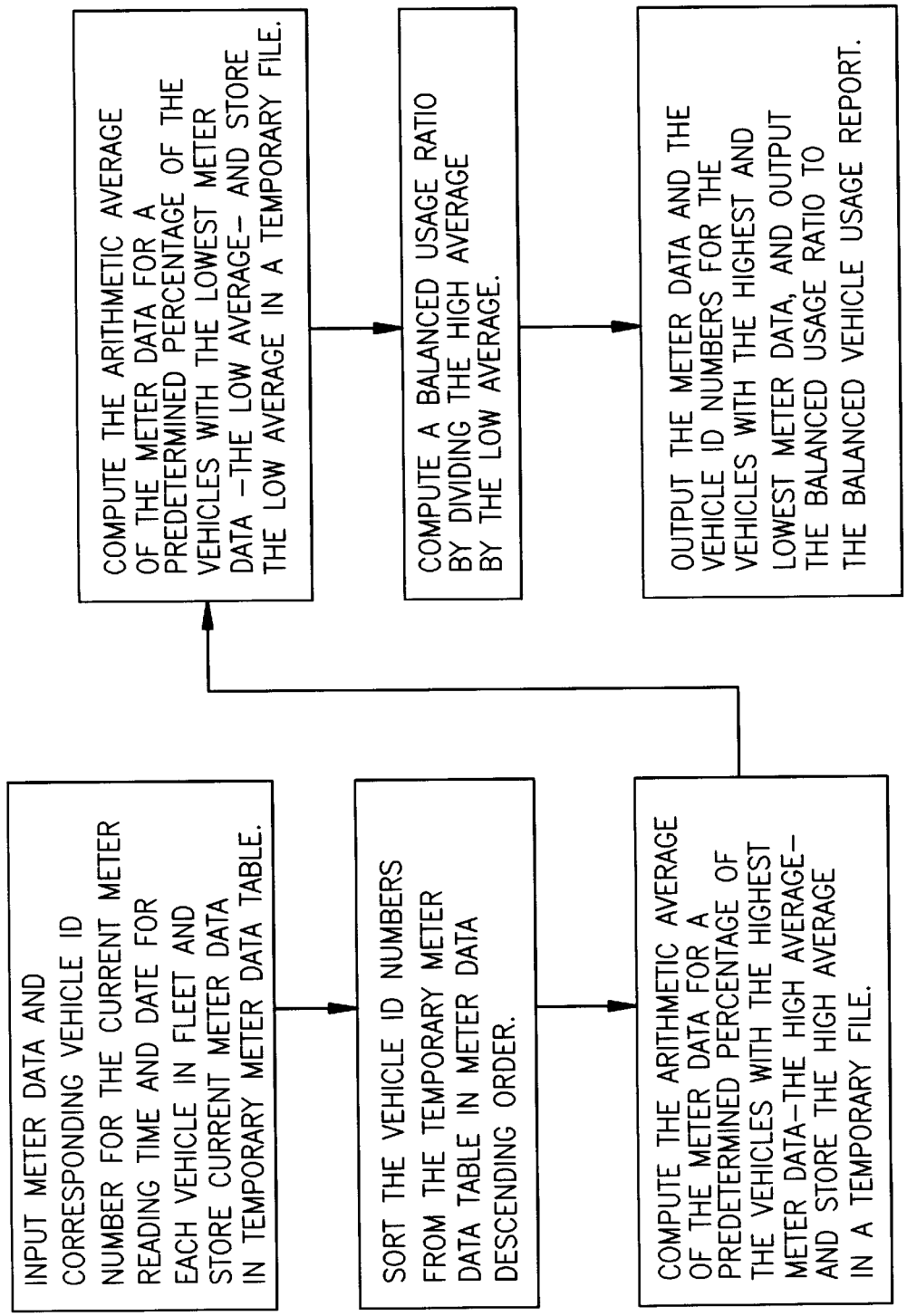
FIG. 12 shows a flow chart of the balanced vehicle usage report process program.

FIGS. 10–12 describe the software program to carry out the vehicle maintenance report process, the meter change summary report process and balanced vehicle usage report process respectively.

Through use of the teachings of the present invention, not only is balanced fleet usage data and meter change summary data collected, time data in the nature of storage of times when rotations took place is also stored. Furthermore, this data is stored within the housing of the hubmeter 10 itself. There is no need to separately mount the microcomputer, memory, clock and receiver device 63 in some other location on the vehicle. Everything is self-contained within the housing 11 allowing the user to easily locate the place where the reading wand 73 is to be directed.

The present invention also incorporates the use of electromagnetic transmission of accumulated data to the external receiver. A preferred wheeled fleet in which the herein disclosed system will operate consists of golf carts. However, the system also will be useful in the trucking industry, on railroad car wheels and the rental car industry.

The prior art describes other mechanical and electronic devices for measuring the distances traveled by a wheeled vehicle that could be substituted for the digital hubmeter 10. These other devices include but are not limited : (1) mechanical odometers which count turns of a wheel, (2) electronic odometers which count pulses from rotation of a wheel, (3) electronic meters which count energy units consumed by the vehicle's power unit (e.g., watt-hour meters), (4) meters which measure the time the vehicle's power unit has operated (e.g., hour-meters).

Any of these devices may be used in place of the digital hubmeter 10 to provide the meter data for the WHEELED FLEET INFORMATION PROCESSING AND REPORTING SYSTEM. Meter data from these devices may be either manually collected and keyed-in to the host computer for processing or loaded-in by other means, as opposed to the digital hubmeter which electronically relays the data to a hand-held computer which computer in-turn transmits the data via a modem to the host computer.

Accordingly, an invention has been disclosed that fulfills each and every one of the objects of the invention and provides a new and useful wheeled fleet information processing and reporting system of great novelty and utility, including, in terms of a preferred embodiment thereof, a hubmeter as well as the associated system for retrieving data therefrom.

Of course, various changes, modifications and alterations in the teachings of the present invention may be contemplated by those skilled in the art without departing from the intended spirit and scope thereof.

As such, it is intended that the present invention only be limited by the terms of the appended claims.

We claim:

1. A self-contained hubmeter, comprising:
    a) a housing defining an internal chamber;
    b) a support fixedly mounted in said chamber and carrying a fixed portion of a rotary bearing, a rotary portion of said bearing protruding through a wall of said chamber and being adapted to be coupled to a wheel of a vehicle to rotate therewith;
    c) said rotary portion having mounted thereto, within said chamber, an elongated pendulum with a magnet attached on a distal end thereof;
    d) said support having mounted thereon a PC board with a pair of magnetic sensors mounted at each opposed ends of the PC board, said magnet being movable closely adjacent each said magnetic sensor in one rotative position thereof; and
    e) a computer mounted adjacent said support within said internal chamber and electrically connected to said magnetic sensor, whereby when said magnet rotates closely adjacent said magnetic sensor, said magnetic sensor senses magnetic field forces and sends a data pulse to said computer, said computer storing data pulses received from said magnetic sensor as pulse data indicative of rotations of a wheel to which said self-contained hubmeter may be attached.

2. The hubmeter of claim 1, further including a clock mounted in said chamber and connected to said computer, said computer periodically retrieving time data from said clock and storing said time data with said data pulse whereby times when data pulse is being generated may be monitored.

3. The hubmeter of claim 1, further including a battery mounted on said support and connected to said computer.

4. The hubmeter of claim 1, wherein said rotary portion of said bearing has a threaded outer periphery.

5. The hubmeter of claim 1, further including communication means connected to said computer for permitting retrieval of pulse data therefrom.

6. The hubmeter of claim 2, further including communication means connected to said computer for permitting retrieval of pulse data and time data therefrom.

7. A system for monitoring operation of a wheeled vehicle including the hubmeter of claim 6, said system further including a further computer with a reading wand connected thereto, said reading wand being movable into close proximity of said communication means, said communication means sensing close proximity of said reading wand and, responsive thereto, causing said computer to transmit pulse data and time data to said further computer.

8. The system of Claim 7, further including a modem connected to said further computer, said further computer transmitting received pulse data and time data via said modem to a host computer.

9. A system for monitoring operation of a wheeled vehicle comprising:
    a self-contained hubmeter, including:
        1) a housing defining an internal chamber;
        2) a support fixedly mounted in said chamber and carrying a fixed portion of a rotary bearing, a rotary portion of said bearing protruding through a wall of said chamber and being adapted to be coupled to a wheel of a vehicle to rotate therewith;
        3) said rotary portion having mounted thereto, within said chamber, an elongated pendulum with a magnet attached on a distal end thereof;
        4) said support having mounted thereon a PC board with a magnetic sensor mounted at each opposed ends of the PC board, said magnet being movable in close adjacency with each said magnetic sensor in one rotative position thereof; and
        5) a computer mounted adjacent said support within said internal chamber and electrically connected to each said magnetic sensor, whereby when said magnet rotates into close adjacency with each said magnetic sensor, said magnetic sensor senses magnetic field forces and sends a data pulse to said computer, said computer storing data pulses received from each said magnetic sensor as pulse data indicative of rotations of a wheel to which said hubmeter may be attached;
    b) a further computer with a reading wand connected thereto, said reading wand being movable into close proximity of communication means associated with said computer, said communication means sensing close proximity of said reading wand and, responsive thereto, causing said computer to transmit pulse data to said further computer.

10. The system of Claim 9, further including a clock mounted in said chamber and connected to said computer, said computer periodically retrieving time data from said clock and storing said time data with said pulse data whereby times when pulse data is being generated may be monitored, said communication means transmitting said time data to said further computer.

11. The system of claim 10, further including a modem connected to said further computer, said further computer transmitting received pulse and time data via said modem to a host computer.

12. The system of claim 11, further including an information processing and report generation program residing in said host computer, said program receiving pulse and time data via the modem, the programming performing mathematical and sorting functions on the data, and assembling the processed data into tables printed in report form for a user.

13. The system according to claim 9 wherein the wheeled vehicle is a golf cart.

14. The system according to claim 9 wherein the tables printed in report form are a vehicle maintenance report, a meter change summary report and a balanced vehicle usage report.

15. A system for monitoring and reporting the use of a vehicle, including the time the vehicle is used and the distance traveled, comprising:

a measuring apparatus fixed to the vehicle for measuring the distance the vehicle is traveling and creating vehicle travel and time data representative of the distance travel by the vehicle and the time the travel occurred;

a vehicle computer coupled to the measuring apparatus, the vehicle computer having memory electrically coupled thereto for storing the travel and time data received from the measuring apparatus;

a vehicle wireless communication means electrically coupled to the vehicle computer and memory;

a remote wireless communication means for automatically receiving the vehicle travel and time data from the vehicle wireless communication means, the vehicle computer through the wireless communication means, sensing close proximity of remote wireless means and transmitting the travel and time data to the remote wireless communications means; and a remote computer coupled to the remote wireless communication means for receiving and storing the travel and time data automatically received by the remote wireless communication means from the vehicle wireless communication means and storing the vehicle travel and time data;

wherein the measuring apparatus further comprises:
(a) a housing defining an internal chamber
(b) a support fixedly mounted in the chamber and carrying a fixed portion of a rotary bearing, a rotary portion of the bearing protruding through a wall of the chamber and being adapted to be coupled to a wheel of a vehicle to rotate therewith;
(c) the rotary portion having mounted thereto, within the chamber, an elongated pendulum with a magnet attached on a ~distal end thereof, and
(d) the support having mounted thereon a PC board with a pair of magnetic sensors mounted at each opposed ends of the PC board, the magnet being movable closely adjacent the magnetic sensor in one rotative position thereof, and the vehicle computer mounted adjacent the support and electrically connected to the magnetic sensor, whereby when the magnet rotates closely adjacent the magnetic sensor, the magnetic sensor senses magnetic field forces and sends a data pulse to the vehicle computers, the vehicle computer storing data pulses received from the magnetic sensor as travel data indicative of rotations of a wheel to which the measuring apparatus may be attached.

16. The system of claim 15 further comprising:
a main computer for receiving the time and travel data from the remote computer through a computer communication means, the main computer processing the vehicle travel and time data to determine and document the operation of the vehicle.

17. The system of claim 16 wherein the computer communication includes a modem for transmitting the vehicle travel and time data to the main computer.

18. The system of claim 15 wherein the measuring apparatus further comprises a sensor for determining the number of rotations of the vehicle's wheel for determine the distance traveled by the vehicle.

19. The system of claim 15, further including a clock mounted in the chamber electrically coupled to the vehicle computer, the computer periodically retrieving time data from the clock and storing the time data with the travel data whereby the time when the vehicle is traveling may be monitored.

* * * * *